United States Patent
Tin et al.

(10) Patent No.: US 9,613,300 B2
(45) Date of Patent: Apr. 4, 2017

(54) MATERIAL CLASSIFICATION USING MULTIVIEW CAPTURE

(71) Applicant: CANON KABUSHIKI KAISHA, Tokyo (JP)

(72) Inventors: Siu-Kei Tin, Milpitas, CA (US); Sandra Skaff, Mountain View, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 14/742,644

(22) Filed: Jun. 17, 2015

(65) Prior Publication Data

US 2016/0371568 A1    Dec. 22, 2016

(51) Int. Cl.
  *G06K 9/62* (2006.01)
  *G06N 99/00* (2010.01)
  *G06N 7/00* (2006.01)

(52) U.S. Cl.
  CPC ........... *G06K 9/6277* (2013.01); *G06N 7/005* (2013.01); *G06N 99/005* (2013.01)

(58) Field of Classification Search
  CPC ............. G01N 21/55; G01N 2021/845; G01N 2201/0627; G01N 21/255; G06N 99/005; B07C 5/342; B07C 5/3422; G06K 9/2018; G06K 9/209; G06K 9/4661; G06K 9/628
  USPC ........................................................ 382/159
  See application file for complete search history.

(56) References Cited

U.S. PATENT DOCUMENTS

| 5,028,138 | A | 7/1991 | Wolff | 356/369 |
| 6,122,042 | A | 9/2000 | Wunderman et al. | 356/73 |
| 6,603,877 | B1 | 8/2003 | Bishop | 382/165 |
| 7,449,655 | B2 | 11/2008 | Cowling et al. | 209/577 |
| 2015/0144537 | A1 | 5/2015 | Skaff | 209/577 |
| 2015/0219557 | A1* | 8/2015 | Skaff | G01N 21/55 702/189 |

OTHER PUBLICATIONS

J. Gu et al., "Discriminative Illumination: Per-Pixel Classification of Raw Materials based on Optimal Projections of Spectral BRDF", IEEE Conference on Computer Vision and Pattern Recognition, CVPR 2012, pp. 797-804, Jun. 2012.

* cited by examiner

*Primary Examiner* — Manuchehr Rahmjoo
(74) *Attorney, Agent, or Firm* — Fitzpatrick Cella Harper & Scinto (57) ABSTRACT

Multiple pixels are selected from one or more images of an object fabricated from an unknown material captured from one or more viewing directions and one or more trained classification engines are applied to the selected pixels so as to obtain initial estimates of the material at each selected pixel. The one or more trained classification engines are each trained at a training direction and are each characterized by performance characteristics that vary based at least in part on directional deviation from that training direction. A posterior probability for the collection of selected multiple pixels is calculated, wherein the posterior probability is calculated based at least in part on the performance characteristics and directional deviation of a surface normal of the object at a selected pixel from the one or more training directions. The material of the object is classified based on the calculated posterior probability.

21 Claims, 6 Drawing Sheets

MATERIAL CLASSIFICATION USING MULTIVIEW CAPTURE

FIELD

The present disclosure relates to material classification in which an object fabricated from an unknown material is illuminated with light, and light reflected therefrom is measured in order to classify the unknown material.

BACKGROUND

In the field of material classification, it has been shown that a material can be classified by a material property based on the bidirectional reflectance distribution function, or BRDF. The BRDF quantifies the angular dependence of reflectance as a function of the incident light direction ($\omega_i$) and viewing direction ($\omega_o$), with these directions often being defined with respect to the surface normal vector (n). Each direction (such as $\omega_i$ or $\omega_o$) is itself ordinarily defined by an azimuth angle ($\phi$) and a zenith angle ($\theta$), therefore the BRDF as a whole is typically a 4-dimensional function that may be used to define a surface characteristic of a material.

SUMMARY

For the purposes of material classification, measuring the BRDF in the full 4-dimensional space can be time prohibitive and resource intensive. Thus, recent approaches have measured 1-dimensional or 2-dimensional slices of the BRDF instead. In these approaches, fixed cameras and light sources are used in capturing images of an object fabricated from a known material and of a known shape, typically a flat sample object. Each combination of camera viewing direction and light source illumination direction provides a data point for the BRDF of that material (BRDF slice), which in turn is used to train a material classification engine. The classification engine can then be used to classify an object fabricated from an unknown material.

One difficulty with the foregoing approach is that the resulting classification engine can only be used to classify flat objects or objects with the same shape as those used in training the classification engine. Typically, the flat sample objects are all oriented in the same direction N, called the training direction. In other words, the surface normals of the flat sample objects all point in the training direction N, and the performance of the classification engine is optimized for the training direction N. When applying the classification engine to a pixel of an image of an object of unknown material, so as to classify the material corresponding to the pixel, the surface normal vector n at the pixel should be aligned with the training direction N for maximum accuracy. For practical purposes, this requires the object of unknown material to also have a flat surface, the same as that of the sample objects.

If the classification engine is applied to a pixel whose surface normal vector n deviates from the training direction N of the classification engine, the performance of the classification engine and the accuracy of the classification, will suffer.

The foregoing is addressed by characterizing the classification engine by its performance characteristics as a function of directional deviation from the training direction N, and by using these performance characteristics, together with directional deviation of the surface normal of the unknown object from the training direction, to classify the material of the object.

Thus, in an example embodiment described herein, material classification of an object fabricated from an unknown material includes selecting multiple pixels from an image of the object captured at a first viewing direction, and applying a trained classification engine to the selected multiple pixels so as to obtain an initial estimate of the material at each selected pixel. The trained classification engine is trained at a first training direction and is characterized by performance characteristics that vary based at least in part on directional deviation from the first training direction. A posterior probability for the collection of selected multiple pixels is calculated, wherein the posterior probability is calculated based at least in part on the performance characteristics and a directional deviation of a surface normal vector of the object at a selected pixel from the first training direction. The material of the object is classified based on the calculated posterior probability.

By characterizing the performance characteristics of the classification engine by its dependence on the directional deviation of surface normal from the training direction N, the reliability of the initial estimate of material at the selected multiple pixels can be taken into account when calculating the posterior probability that the object is made of a certain material, at least in part because it is assumed that an initial estimate at a pixel whose surface normal deviates only slightly from the training direction is relatively reliable whereas an initial estimate at a pixel whose surface normal deviates greatly from the training direction is relatively unreliable. It is therefore ordinarily possible to use a BRDF-based material classification engine to classify the material of an object whose shape differs from those used in training the classification engine, such as a non-flat object.

In another example aspect, multiple pixels from a second image of the object captured at a second viewing direction different from the first viewing direction may be selected, and a second trained classification engine may be applied to the selected pixels of the second image so as to obtain an initial estimate of the material at each selected pixel of the second image. The posterior probability may be calculated for the collection of both the selected pixels of the first image and the selected pixels of the second image. The second trained classification engine may be trained at a second training direction and may be characterized by performance characteristics that vary based at least in part on directional deviation from the second training direction. The posterior probability may be calculated using a combination of initial estimates of material from the first trained classification engine and initial estimates of material from the second trained classification engine.

In further example aspects, the surface normal n of an object can be determined through photometric stereo techniques. Alternatively, the surface normal vector n may be obtained independently by other methods.

In an example aspect of a training method for training a classification engine, one or more images of one or more objects fabricated from known material and oriented in alignment with the training direction N are captured. The pixel data of the captured images may then be used to train the material classification engine. For example, the pixel data may be used to train the classification engine to classify material by using a material property based on the BRDF.

Thus, training direction N may be a property of the material classification engine. Accordingly, the directional deviation of a surface normal vector n from training direction N may be measured by the cosine of the angle between them. The performance characteristics of the classification engine can thus be described by a confusion matrix whose entries depend on the cosine of the angle between n and N, or the dot product n·N. In other words, the performance characteristics of the classification engine may be defined for a range of angles relative to the training direction N. The performance characteristics of the classification engine according to such angle-dependent confusion matrix may be predetermined during the training phase by applying the trained material classification engine to pixels of multiple images of an object fabricated from a known material as the object is rotated at multiple angles relative to the training direction N.

The trained classification engine may be optimized for a surface normal that is aligned with the training direction N. Alternatively, the trained classification engine may be optimized for a surface normal that is aligned with a fixed direction different from the training direction N. In both examples, the performance of the classification engine can be described by its performance characteristics.

In an example aspect of the classification phase, the material of an object is classified by calculating a posterior probability. According to such example aspect, K independently sampled pixels of an image of the object captured at a viewing direction may be selected and a surface normal may be determined for each selected pixel. A trained classification engine may be applied to each selected pixel to obtain an initial estimate of material at each pixel. A likelihood probability of the initial estimate of material at each selected pixel may then be estimated based on the directional deviation of the determined surface normal vector for each pixel from the training direction N. A joint likelihood probability for the total collection of selected pixels can be deduced from the estimated likelihood probabilities at the selected pixels. Bayes' Rule may be applied to the deduced joint likelihood probability to yield the posterior probability. The material of the object being inspected may thereafter be classified using the calculated posterior probability. For example, the material of the object may be classified by maximizing the calculated posterior probability.

In another example aspect, the number K of selected pixels is predetermined where this predetermined number is chosen such that an a priori estimate of the posterior probability is relatively high.

In another example aspect, a confidence level may be assigned to the classified material of the object. If the confidence level is determined to be below a predetermined acceptance value, additional images of the object may be captured from different viewing directions, the material may be re-classified using the additional images and a confidence level may be re-assigned to the re-classified material to determine if it is above the predetermined acceptance value.

This brief summary has been provided so that the nature of this disclosure may be understood quickly. A more complete understanding can be obtained by reference to the following detailed description and to the attached drawings.

DETAILED DESCRIPTION

Figure 1:
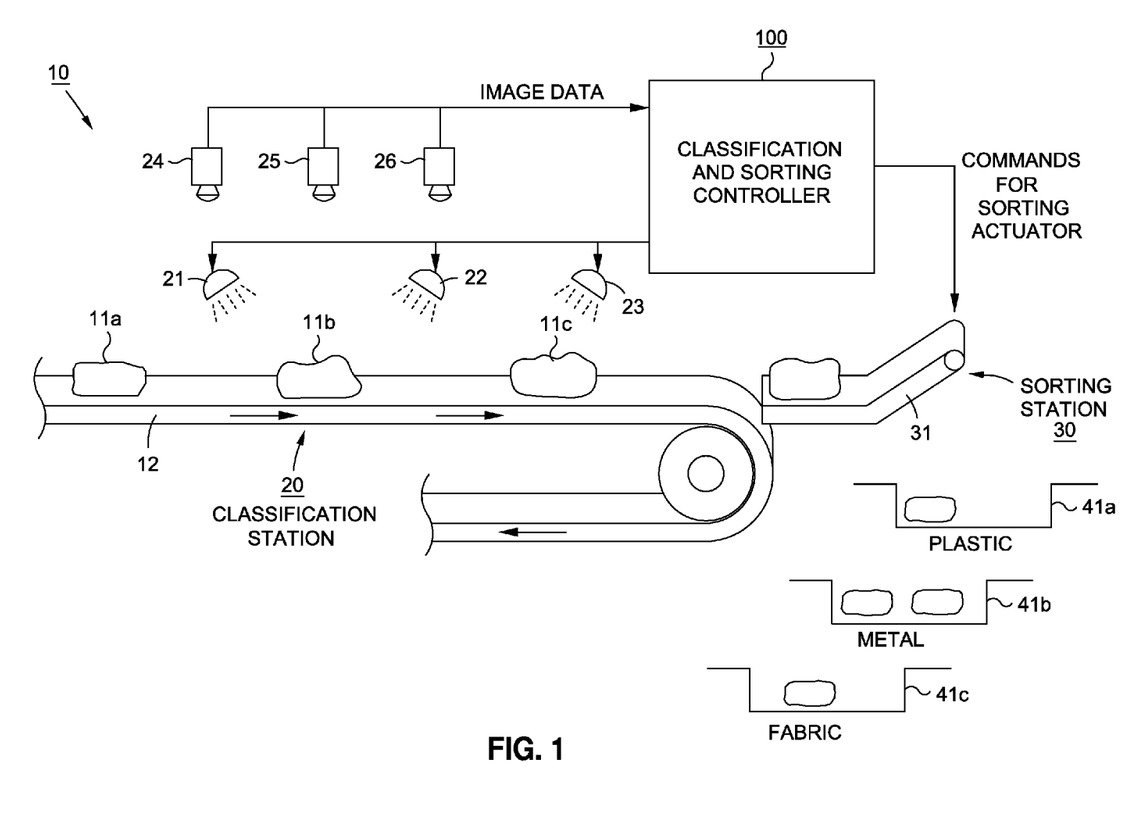
FIG. 1 is an example embodiment of a classification system according to the description herein, in the form of a recycling system in which objects to be recycled are classified according to the materials from which the objects are fabricated, and the classified objects are sorted for recycling according to their material classification.

FIG. 1 is an example embodiment of a classification system according to the description herein, in the form of a recycling system 10 in which objects to be recycled are classified according to the materials from which the objects are fabricated, and the classified objects are sorted for recycling according to their material classification.

While FIG. 1 depicts a recycling and/or sorting environment, it should be understood that this is simply an example environment in which the disclosure may be practiced, and that other environments or embodiments are of course possible. For example, material classification could also be used in the context of manufacturing, robotics, machine vision, quality control, image retrieval and security, among many others.

As shown in FIG. 1, objects 11a, 11b, etc. are conveyed on a conveyor mechanism 12 to a classification station 20, where the objects are classified according to their material, and thence to a sorting station 30, where the objects are sorted, re-routed, or otherwise processed according to their material classification or identification. As shown in FIG. 1, the objects can have arbitrary shapes including flat or non-flat shapes. It should be understood that conveyor mechanism 12 is simply an example of an arrangement that includes a classification station. In addition, although FIG. 1 depicts three objects, any number of objects may appear on conveyor mechanism 12 at a time.

Classification station 20 includes plural light sources 21, 22 and 23, together with plural image capture devices 24, 25 and 26 for capturing images of objects positioned at classification station 20 under illumination by the light sources. In some example embodiments, an object at the classification station is illuminated individually by each of the plural light sources under control of classification and sorting controller 100, and one or more of the image capture devices 24, 25 or 26 captures one or more images for each individual illumination. Under control of the classification and sorting controller 100, a classification is made for the material from which the object is fabricated.

Conveyor mechanism 12 continues to convey the objects to sorting station 30, where sorting actuator 31 sorts the objects according to the material classification. Sorting is controlled by classification and sorting controller 100, which commands actuator mechanism 31 to sort the classified objects into multiple receptacles 41a, 41b and 41c.

In this example embodiment, material classification differentiates between different types of materials from which the objects are fabricated, such as plastic, metal and fabric. Naturally, it will be understood that this is a non-limiting example. In other embodiments, material classification could differentiate between metals such as brass, copper and aluminum, between different types or colors of plastics and glass, and so forth, or between any and all of these.

In addition, other embodiments might include a classification of "unknown", signifying that material classification did not succeed with confidence, with a corresponding receptacle for which manual sorting is required.

In FIG. 1, image capture devices 24, 25 and 26 are shown as digital still cameras or digital video cameras. It is understood, however, that the following description encompasses arbitrary arrangements which can incorporate or utilize imaging assemblies with capture optics, for instance, a data processing apparatus having an image sensing function (e.g., a personal computer) or a portable terminal having an image sensing function.

It should be also understood that controller 100 may be included in a computer, the computer generally comprising a programmable general purpose computer having an operating system, such as Microsoft® Windows® or Apple® Mac OS® or LINUX, and which is programmed as described below so as to perform particular functions and, in effect, become a special purpose computer when performing these functions.

In some embodiments, the computer may be a mobile computer. In addition, computing equipment for practicing aspects of the present disclosure can be implemented in a variety of embodiments. For example, in some embodiments, the functionality of controller 100 may be incorporated into image capture devices 24, 25 and 26. In other embodiments, the computer may comprise, for example, a desktop computer or a computing cluster, or may include an imaging device instead of communicating with separate image capture devices 24, 25 and 26. Other embodiments are possible according to the application and environment.

A description will now be made of the directionality of the plural light sources 21, 22 and 23 and plural image capture devices, or cameras, 24, 25 and 26 relative to the object at the classification station.

Figure 2:
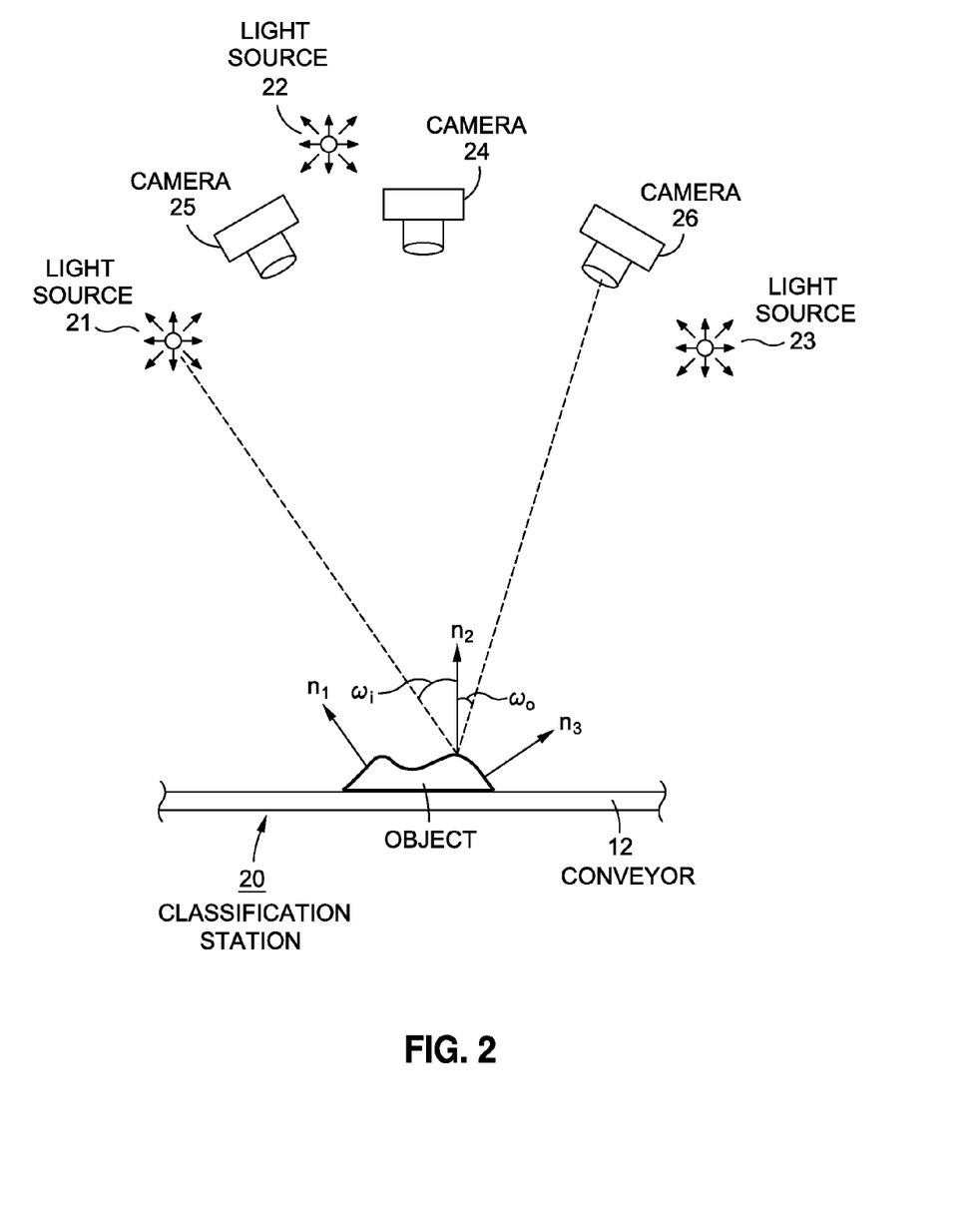
FIG. 2 is a more detailed view of an object being subjected to classification at a classification station of the FIG. 1 view.

FIG. 2 is a more detailed view of an object on conveyor mechanism 12 at classification station 20. In this figure, light source 21 is directed at a first incident angle, light source 22 is positioned at a second incident angle, and light source 23 is directed at a third incident angle. Also in this example, camera 24 is directed at a viewing angle of 0 degrees from the vertical, camera 25 is directed at a viewing angle of +30 degrees from the vertical, and camera 26 is directed at a viewing angle of −30 degrees from the vertical, relative to an object at classification station 20. Material classification is done by applying one or more trained classification engines to pixels of images captured of the object at classification station 20. These classification engines are trained using light sources and cameras with set directionality, and the directionalities of the light sources and cameras at classification station 20 are arranged to be the same as the directionalities used in the training setup. The training setup is described more fully below with respect to FIG. 6 and the accompanying text.

For simplicity, the example of FIG. 2 depicts the directionality of the light sources and cameras in two dimensions. However, typical examples may also include combinations of incident and exitant angles in three dimensions.

As shown in FIG. 2, this example embodiment includes three (3) light sources and three (3) cameras. In general, in order to facilitate rapid classification of materials, such as real-time classification of materials, the number of light sources and the number of cameras is relatively small, such that materials can be classified with only a few illuminations and with only a few images for each such illumination.

However, multiple light sources and cameras provide for additional image data and improved accuracy of the material classification system.

Under control of classification and sorting controller 100, each light source of the plural light sources illuminates individually and independently of other light sources. For each such illumination, cameras 24, 25 and 26 capture images of light reflected from the object at their respective viewing angles. The captured images are collected by classification and sorting controller 100, and are analyzed thereby, such as by deriving one slice of the so-called bidirectional reflectance distribution function (BRDF). The BRDF is a four-dimensional function that depends on incident and viewing angles, and defines how light is reflected from the surface of an object. With each camera positioned at a fixed viewing angle, only a "slice" of the BRDF is obtained by each camera for each illumination.

Figure 3:
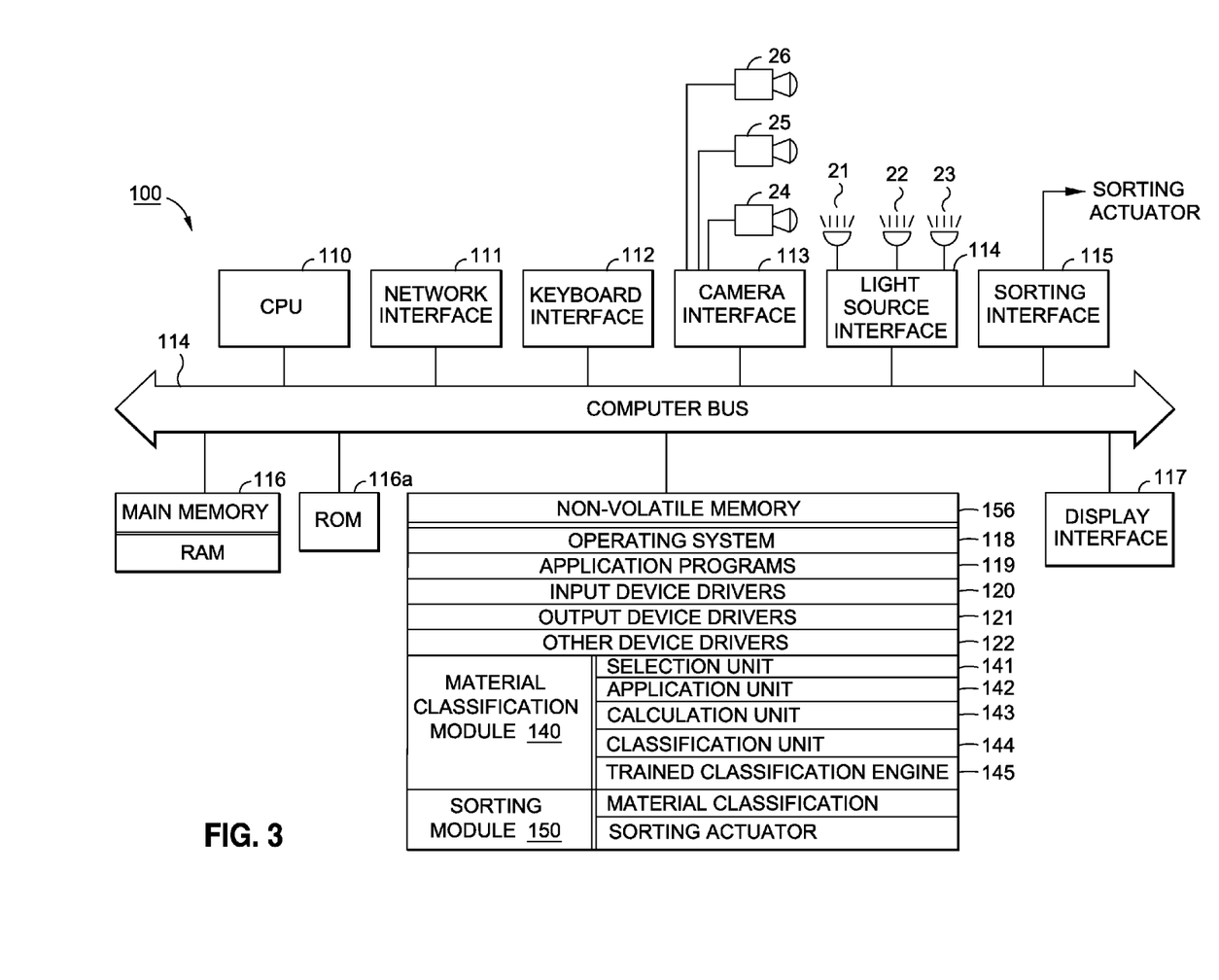
FIG. 3 is a view for explaining the architecture of a classification and sorting controller according to an example embodiment.

FIG. 3 is a view for explaining the architecture of classification and sorting controller 100.

As shown in FIG. 3, classification and sorting controller 100 includes central processing unit (CPU) 110 which interfaces with computer bus 114. Also interfacing with computer bus 114 are non-volatile memory 156 (e.g., a hard disk or other nonvolatile storage medium), network interface 111, keyboard interface 112, camera interface 113, random access memory (RAM) 116 for use as a main run-time transient memory, read only memory (ROM) 116a, and display interface 117 for a display screen or other output.

RAM 116 interfaces with computer bus 114 so as to provide information stored in RAM 116 to CPU 110 during execution of the instructions in software programs, such as an operating system, application programs, image processing modules, and device drivers. More specifically, CPU 110 first loads computer-executable process steps from non-volatile memory 156, or another storage device into a region of RAM 116. CPU 110 can then execute the stored process steps from RAM 116 in order to execute the loaded computer-executable process steps. Data, also, can be stored in RAM 116 so that the data can be accessed by CPU 110 during the execution of the computer-executable software programs, to the extent that such software programs have a need to access and/or modify the data.

As also shown in FIG. 3, non-volatile memory 156 contains computer-executable process steps for operating system 118, and application programs 119, such as graphic image management programs. Non-volatile memory 156 also contains computer-executable process steps for device drivers for software interface to devices, such as input device drivers 120, output device drivers 121, and other device drivers 122.

Non-volatile memory 156 also stores a material classification module 140 and a sorting module 150. The material classification module 140 and the sorting module 150 comprise computer-executable process steps for material classification of an object fabricated from an unknown material, and for sorting the object based on the material classification.

As shown in FIG. 3, material classification module 140 generally comprises selection unit 141, application unit 142, calculation unit 143, classification unit 144 and one or more trained classification engines 145. In some example embodiments, the material classification module also includes a corresponding plurality of modules for control of the light sources, for control of the camera(s) and for gathering of image data of such camera(s), a module for derivation of feature vectors according to a feature vector algorithm, such as feature vectors based on texture discrimination, spectral signature, BRDF, and a bidirectional surface scattering reflectance distribution function. In such example embodiments, the classification unit 144 accepts as inputs the feature vectors derived by the feature vector module, and provides a classification of the material from which the object under inspection is fabricated.

Sorting module 150 for its part includes a corresponding plurality of modules related to input of material classification from the classification machine, and actuation of the sorting mechanism based on the classification.

The computer-executable process steps for these modules may be configured as part of operating system 118, as part of an output device driver in output device drivers 121, or as a stand-alone application program. These modules may also be configured as a plug-in or dynamic link library (DLL) to the operating system, device driver or application program. It can be appreciated that the present disclosure is not limited to these embodiments and that the disclosed modules may be used in other environments.

FIGS. 4A through 4D are graphs depicting the performance characteristics of one of the trained material classification engines 145. These performance characteristics vary based at least in part on directional deviation from the trained material classification engine's training direction. In the example of FIGS. 4A through 4D, the performance characteristics are described by a confusion matrix.

In general, an M×M confusion matrix may be used to describe the performance characteristics of an M-class classification engine. The confusion matrix would be in the format of a contingency table that shows the frequency distribution of predicted and actual classifications made by the classification engine on a training set When the training set is large, the entries of the confusion matrix, which are counts, or frequencies, approach a probability distribution. Specifically, the (i, j)th entry can be interpreted as a probability p(predicted class=j|true class=i). FIGS. 4A through 4D are graphs of the entries. Furthermore, if the performance of the classification engine depends on a state c of the object being classified, then we may also consider the confusion matrix as being a function of c, i.e., each entry of the confusion matrix is a function of c.

In FIGS. 4A through 4D, the performance characteristics of a binary material classification engine are shown as a function of the state c=c(n,N), where c is the cosine of the angle between a fixed training direction N, in which the binary classification engine was trained, and the surface normal vector n of a pixel of an image of an object of unknown material to which the binary classification engine is applied.

As described more fully below with respect to Equation 1 and the accompanying text, a confusion matrix such as that depicted in FIGS. 4A through 4D can be used to characterize the performance of a classification engine by describing the accuracy of the classification engine as a pixel's surface normal vector n deviates from the classification engine's training direction N.

In general, these graphs show that classification accuracy changes as a function of directional deviation from the training direction, with the classification engine typically performing relatively well when the surface normal vector n at a pixel on the object's image coincides with the training direction (i.e., when the cosine c is equal to 1).

In FIGS. 4A through 4D, the performance of a trained binary classification engine is described by the confusion matrix $\gamma_{ij}=p(\hat{x}=j|x=i)$ where x is the random variable of the true material of an object while $\hat{x}$ denotes the random variable of the estimated material as returned by the trained binary classification engine. In each graph, the confusion matrix also depends on cosine c=c(n, N).

Figure 4A:
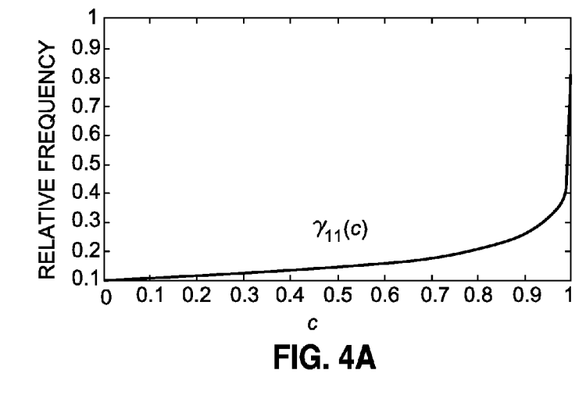
FIGS. 4A through 4D are graphs depicting a confusion matrix for describing the performance characteristics of a trained material classification engine according to an example embodiment.

Thus, FIG. 4A depicts the probability that the classification engine correctly estimates that an object is of material type 1, when the object's true material type is 1. The frequency of this estimation is shown to increase, in this case towards 0.8 or 80%, as the cosine c approaches 1, or as the surface normal vector n approaches the training direction N.

Figure 4B:
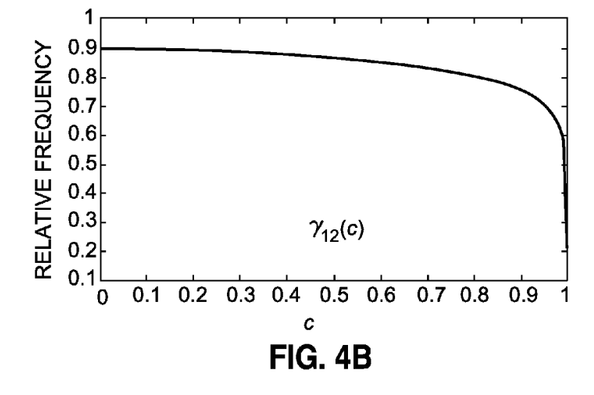

FIG. 4B depicts the probability that the classification engine incorrectly estimates that an object is of material type 2, when the object's true material type is 1. The frequency of this incorrect estimation is shown to decrease towards 0.2 or 20%, as the cosine c approaches 1, or as the surface normal vector n approaches the training direction N.

Figure 4C:
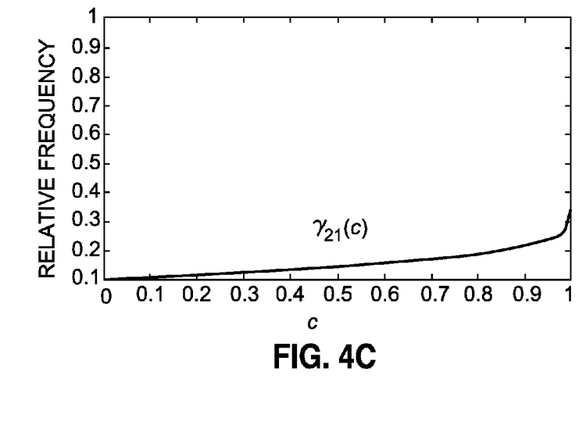

FIG. 4C depicts the probability that the classification engine incorrectly estimates that an object is of material type 1, when the object's true material type is 2. Here, the performance characteristics suggest that the classification engine makes this incorrect estimation with very low frequency, between 0.1 and 0.35 or between 10% and 35% of the time, but that this frequency increases slightly as cosine c approaches 1 (i.e., as the surface normal vector n approaches the training direction N.)

Figure 4D:
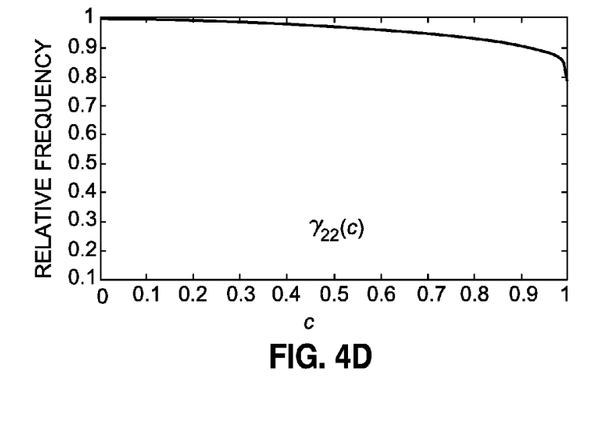

FIG. 4D depicts the probability that the classification engine correctly estimates that an object is of material type 2, when the object's true material type is 2. Here, the performance characteristics suggest that the classification engine makes this correct estimation with very high frequency, between 0.8 and 1 or between 80% and 100% of the time, but that this frequency decreases as cosine c approaches 1 (i.e., as the surface normal vector n approaches the training direction N.)

FIGS. 4C and 4D each give an example of a classification engine that does not necessarily perform more accurately when the surface normal is aligned with the training direction. This may be due to a bias of the classification engine. For example, the classification engine may always predict material type 2 regardless of the measurements. However, the accuracy in each of these cases is still relatively high when the surface normal is aligned with the training direction.

Figure 5:
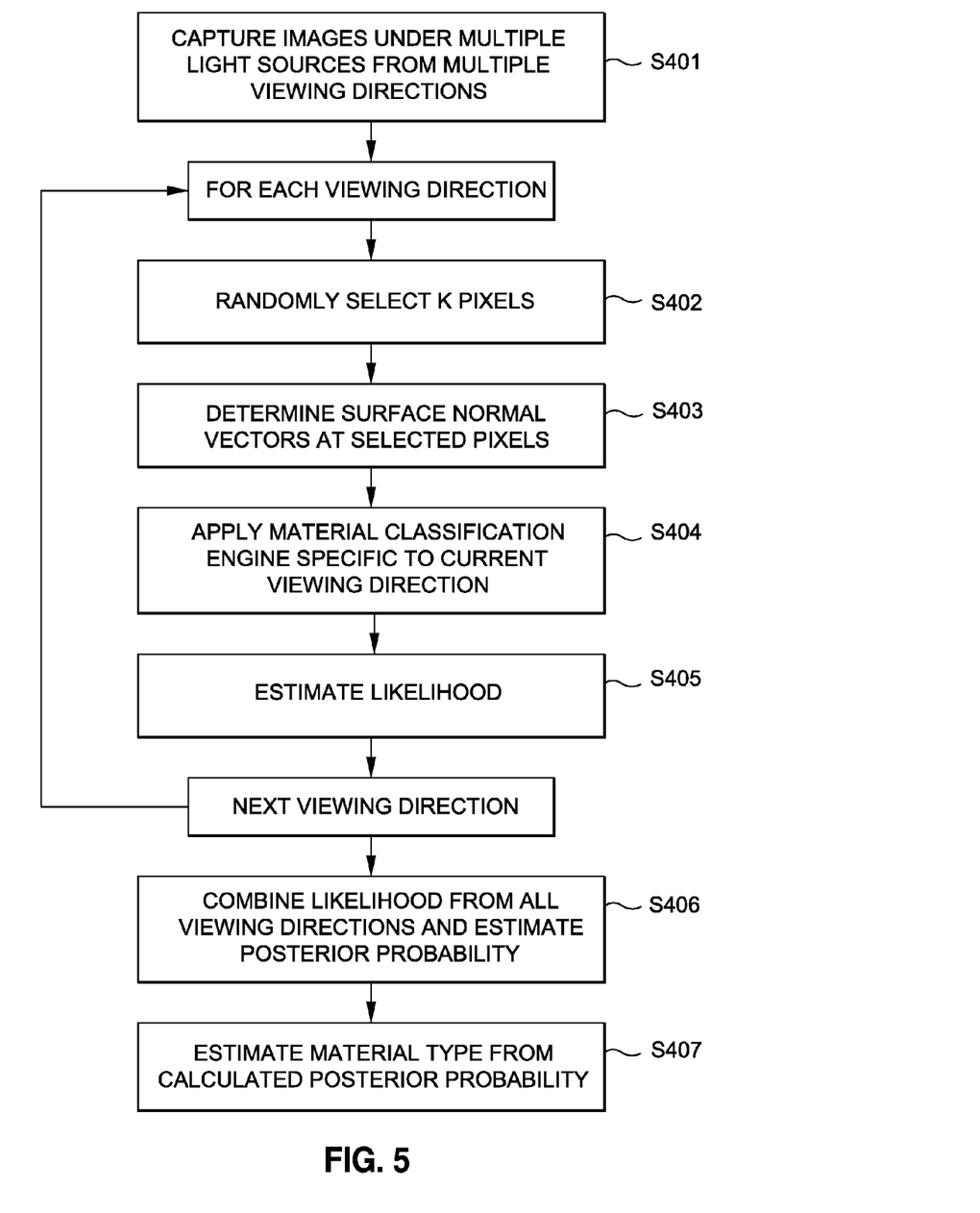
FIG. 5 is a flow diagram for explaining a process for classifying a material according to example embodiments.

FIG. 5 is a flow diagram for explaining a process for classifying a material according to an example embodiment. Briefly, in FIG. 5, the unknown material of an object is classified by capturing images of the object under multiple light sources from multiple camera viewing directions and by applying trained classification engines 145 for each respective camera viewing direction to selected pixels of the images to obtain initial estimates of the material at each selected pixel. The likelihoods of these initial estimates are then determined based on performance characteristics of the trained classification engines 145 and the determined surface normal vectors at each selected pixel. A posterior probability is then calculated from the combined likelihood estimates from all viewing directions and this posterior probability is used to classify the material of the object.

In more detail, in step S401, images of an object of unknown material are captured under multiple light sources from multiple camera viewing directions. The images may preferably be captured under the same illumination conditions as when the trained classification engines 145 were trained. The camera viewing directions may preferably be aligned in the same manner as when the trained classification engines 145 were trained.

For each camera viewing direction above, steps S402 to S405 are performed, although steps S402, S403 and S404 may be performed in any order.

In step S402, K independently sampled pixels of an image of the object captured at a single camera viewing direction are selected. The pixels are sampled from spatially random positions and preferably are spatially independent.

In step S403, the surface normal vectors $n_1, n_2 \ldots n_K$ at each of the selected pixels are determined. Typically, the determination only needs to be approximate. The surface normal vectors may be determined by using photometric stereo or other techniques. Referring to FIG. 2, the plural (at least three) light sources 21, 22 and 23 make it feasible to use photometric stereo techniques to determine surface normal vectors $n_1, n_2 \ldots n_K$ at each of the selected pixels. The determination of surface normal vectors can be approximate, for example, by making the assumption that the object surface is Lambertian, which is a common assumption in methods of photometric stereo.

In step S404, the trained classification engine 145 trained for the current camera viewing direction is used to obtain initial estimates $\hat{x}_1, \hat{x}_2 \ldots \hat{x}_K$ of the material at each pixel. The reliability of these initial estimates may be described by the performance characteristics of the classification engine as the surface normal vectors $n_1, n_2 \ldots n_K$ deviate from training direction N.

Accordingly, in step S405, a likelihood probability of the initial estimate of material at a selected pixel, for example pixel k, is estimated using the performance characteristics of the trained classification engine 145 and the directional deviation of the surface normal vector $n_k$ measured as a dot product $n_k \cdot N$. A joint likelihood probability for the collection of selected pixels, given that the true material is type i, is estimated as follows:

$$L_i = p(\hat{x} = \{\hat{x}_k\}_{k=1,\ldots,K} \mid x = i, \{n_k\}_{k=1,\ldots,K}) = \quad \text{(Equation 1)}$$
$$\prod_{k=1}^{K} p(\hat{x} = \hat{x}_k \mid x = i, n_k) = \prod_{k=1}^{K} \gamma_{i,\hat{x}_k}(n_k \cdot N)$$

where $\hat{x}_k$ is the initial estimate of material at each selected pixel k. K is the total number of selected pixels, i is the true material type, and $\gamma_{i,\hat{x}_k}(n_k \cdot N)$ is an entry of the confusion matrix describing the performance of the classification engine whose entries depend on the cosine of the angle between n and N, or the dot product n·N, as shown, for example, in FIGS. 4A through 4D.

As described above, steps S402 to S405 are completed for each camera viewing direction using the trained classification engine 145 trained for each respective camera viewing direction.

In step S406, a combined likelihood probability from all viewing directions is obtained by multiplying all joint likelihood probabilities from all viewing directions. We first describe this step for a single camera viewing direction. In this case, the combined likelihood probability is the same as the joint likelihood probability for the single viewing direction. Bayes' Rule may then be applied to yield the posterior probability from the likelihood probability $L_i$, given in Equation 1, and an assumed prior probability distribution, such as a uniform prior probability distribution.

By Bayes' Rule, the posterior probability in the non-limiting case of a binary classification engine, assuming a uniform prior probability distribution, i.e. $p(x=1)=p(x=2)=0.5$, is as follows:

$$p(x = i \mid \hat{x} = \{\hat{x}_k\}_{k=1,\ldots,K}, \{n_k\}_{k=1,\ldots,K}) = \quad \text{(Equation 2)}$$
$$\frac{L_i \cdot p(x = i)}{L_1 \cdot p(x = 1) + L_2 \cdot p(x = 2)} = \frac{L_i}{L_1 + L_2}$$

Note that the above posterior probability calculation is applied to one camera viewing direction. In general, a "combined" posterior probability can be calculated by combining information from all camera viewing directions. Since it is assumed that all the sampled pixels are spatially independent, the estimated joint likelihood probabilities from all the viewing directions can be combined by forming a product of all the estimated joint likelihood probabilities from all the viewing directions. Specifically, in refining the notation of $L_i$ above to $L_i(\omega)$ where $\omega$ is the camera viewing direction, and considering now multiple viewpoints $\omega_1, \ldots, \omega_C$ where C is the number of camera viewing directions, the multiplication rule of probability gives a new value for $L_i$:

$$L_i = \prod_{j=1}^{C} L_i(\omega_j) \quad \text{(Equation 3)}$$

The "combined" posterior probability is calculated using the expression $L_1/(L_1+L_2)$ as before.

Additionally, while the above proposed calculations apply to the case of binary classification, a generalization to multi-class classification may also be used. In general, for an M-class classification engine, the posterior probability (assuming a uniform prior probability distribution) is as follows:

$$p(x = i \mid \text{initial material type estimates from all viewing directions}) = \frac{L_i}{L_1 + \ldots + L_M} \quad \text{(Equation 4)}$$

where $L_i$ is the combined joint likelihood probability for material type i, and M is the total number of material types that can be classified by the multi-class classification engine.

In step S407, the material of the object being inspected may thereafter be classified using the above calculated posterior probability. For example, the material of the object may be classified by maximizing the calculated posterior probability. In other words, the estimated material type is given by the following:

$$\hat{i} = \arg\max_i p(x=i \mid \text{initial material type estimates from all viewing directions}) \quad \text{(Equation 5)}$$

where $\hat{i}$ is the material type estimated by maximizing the posterior probability.

The number of randomly selected pixels, K, selected in step S402 and subsequently used in steps S403 to S406, may be determined as follows. On the one hand, in order for the pixels to be statistically independent, a small number should be selected. On the other hand, selecting more pixels improves the posterior probability calculation.

Assume an approximate model for the confusion matrix of the classification engine described by $$(\gamma_{ij}) = \begin{pmatrix} r & 1-r \\ 1-s & s \end{pmatrix},$$

where r and s are parameters that are independent of the directional deviation from the training direction. For a captured image of an object made of material M1, if K pixels are randomly selected, Kr of the pixels would be estimated to be of material M1 and K(1−r) of the pixels would be estimated as material type M2. For a captured image of an object made of material M2, if K pixels are randomly selected, K(1−s) of the pixels would be estimated to be of material M1 and Ks of the pixels would be estimated as material type M2.

The posterior probability may then be calculated as follows:

$$p(x = 1 \mid \hat{x} = \{\hat{x}_k\}_{k=1,\ldots,K}) = \frac{r^{Kr}(1-r)^{K(1-r)}}{r^{Kr}(1-r)^{K(1-r)} + 1(-s)^{Kr}s^{K(1-r)}} = \frac{\left(\frac{r}{1-s}\right)^{Kr}\left(\frac{1-r}{s}\right)^{K(1-r)}}{\left(\frac{r}{1-s}\right)^{Kr}\left(\frac{1-r}{s}\right)^{K(1-r)} + 1}$$ (Equation 6)

To ensure that the above posterior probability is high, a condition may be imposed such that $p(x=1|\hat{x}=\{\hat{x}_k\}_{k=1,\ldots,K}) \geq \rho$ for some relatively high $\rho$ (e.g., $\rho=0.95$). This results in the following heuristic condition for K:

$$K \geq \frac{\log\left(\frac{\rho}{1-\rho}\right)}{r\log\left(\frac{r}{1-s}\right) + (1-r)\log\left(\frac{1-r}{s}\right)}$$ (Equation 7)

For example, given r=0.6 and s=0.7, which are somewhat typical values for a classification engine with acceptable accuracy, and a target of $\rho$=0.95, Equation 7 yields K≥15.33. Accordingly, in this example, 16 randomly selected pixels, K, should be selected to achieve a posterior probability estimate of at least 0.95.

Considering the posterior probability as a measure of the confidence level of an estimated material type, a threshold confidence level, e.g., 95%, may be imposed. Samples may be rejected if the posterior probability is below the threshold confidence level. When a sample is rejected, a manual classification may be performed or the system may re-acquire additional images from additional camera viewing directions in order to improve the posterior probability estimate, at the expense of additional acquisition time.

In the examples that follow, a naïve approach of the material classification method known in the art, which typically uses only one camera, is compared to the approach of calculating a posterior probability as described above. In the naïve approach, there is only one camera viewing direction and a trained classification engine is trained for this viewing direction with an associated training direction N, typically pointed upwards and towards the camera. In the examples that follow, a binary classification engine is considered.

The naïve approach is to apply the trained binary classification engine to the captured image(s) to classify pixels by the material type. Then, for example, a majority vote of the pixels may be used to estimate the material type. In Table 1, the column labeled "naïve" shows a possible result when applying the naïve majority vote of pixels to 10 arbitrarily shaped objects all made of material M1.

TABLE 1

| Sample | Naïve | Posterior (0 deg) | Posterior (30 deg) | Posterior (−30 deg) | Posterior (All Views) |
|---|---|---|---|---|---|
| 1 | M2 | 0.5788 | 0.9749 | 0.8639 | 0.9971 |
| 2 | M2 | 0.5284 | 0.9330 | 0.9585 | 0.9972 |
| 3 | M2 | 0.9733 | 0.9975 | 0.8524 | 1.0000 |
| 4 | M1 | 0.9996 | 0.9934 | 0.4024 | 1.0000 |
| 5 | M2 | 0.2473 | 0.9833 | 0.7796 | 0.9856 |
| 6 | M2 | 0.4889 | 0.8063 | 0.9807 | 0.9951 |
| 7 | M2 | 0.7114 | 0.9855 | 0.8907 | 0.9993 |
| 8 | M2 | 0.9888 | 0.8392 | 0.5542 | 0.9983 |
| 9 | M2 | 0.9321 | 0.9202 | 0.2755 | 0.9836 |
| 10 | M2 | 0.8672 | 0.1413 | 0.9871 | 0.9880 |

Because the surface normal vectors of these 10 objects vary spatially on the objects' surfaces and also deviate significantly from the upward normal, there is only a 10% success rate in a short 10-trial run. That is, because the objects being classified have arbitrary shapes whose surface normals frequently deviate from that of the flat shaped sample object used to train the classification engine, at a number of the pixels to which the engine is applied, the engine frequently makes a false estimate of the material type based on the captured BRDF slice. A majority vote of the pixels typically provides an incorrect estimate of the material type. The result is that the classification engine applied in this manner correctly identified the material as M1 in only 1 out of the 10 objects.

For comparison, Table 1 also includes posterior probability calculations applied to single camera viewing directions. The columns labeled "Posterior (0 deg)", "Posterior (30 deg)" and "Posterior (−30 deg)" respectively each show the posterior probability calculation that an object is of material M1 for 10 exemplary objects all made of material M1, wherein each column respectively is based on one of three different camera viewing directions. It is shown that using any one of the three camera viewing directions and the posterior probability approach gives significantly better results than the naïve majority vote approach. For example, for the camera viewing direction at 0 degree, the posterior probability calculation estimates that the material is M1 (posterior probability greater than 0.50) for 8 out of 10 of the objects. Similarly, 9 out of 10 of the objects are correctly classified as M1 at the 30 degree camera viewing direction and 8 out of 10 of the objects are correctly classified as M1 at the −30 degree camera viewing direction.

Also shown in Table 1 are posterior probability calculations combining information from all three views. The column labeled "Posterior (All Views)" shows the combined posterior probability that the objects are made of material M1 considering all three camera viewing directions. The combined results indicate improved accuracy, with all 10 of the objects being correctly classified as material M1.

Table 2, below, shows the result of success (true positive) rate for identifying material type M1 from 1000 arbitrarily shaped objects all made of material M1.

TABLE 2

| Naïve | Posterior (0 deg) | Posterior (30 deg) | Posterior (−30 deg) | Posterior (All Views) | Posterior (All Views with 95% acceptance) |
|---|---|---|---|---|---|
| 3.40% | 81.40% | 81.10% | 81.90% | 94.00% | 75.20% |

Table 2 includes posterior probability calculations applied to each of three single camera viewing directions, a combined posterior probability calculation applied to all views, and a combined posterior probability having a confidence level with a 95% acceptance value.

In a trial run of 1000 objects, the posterior probability calculations are shown to have a relatively high accuracy, even when taken from a single camera viewing direction. That accuracy is once again shown to be improved when a combined posterior probability is calculated from multiple camera viewing directions. Furthermore, the accuracy is relatively high even when imposing a strict threshold confidence level of 95%.

Finally, Table 3 shows the false positive rate from 1000 arbitrarily shaped objects made of material M2.

TABLE 3

| Naïve | Posterior (0 deg) | Posterior (30 deg) | Posterior (−30 deg) | Posterior (All Views) | Posterior (All Views with 95% acceptance) |
|---|---|---|---|---|---|
| 0.00% | 18.40% | 17.00% | 19.00% | 5.70% | 0.60% |

Table 3 includes posterior probability calculations applied to each of three single camera viewing directions, a combined posterior probability calculation applied to all views, and a combined posterior probability having a confidence level with a 95% acceptance value.

Once again, in a trial run of 1000 objects, the posterior probability calculations are shown to have a relatively high accuracy, even when taken from a single camera viewing direction, as they yield a false positive estimate of the material type less than 20% of the time. That accuracy is once again shown to be improved when a combined posterior probability is calculated from multiple camera viewing directions, wherein false positive estimates are made less than 6% of the time. By construction, the false positive rate is very low when imposing a strict threshold confidence level of 95%.

As can be seen from the results shown in Tables 1, 2 and 3, the combined posterior probability provides improved accuracy over posterior probability calculations applied to single camera viewing directions.

Figure 6A:
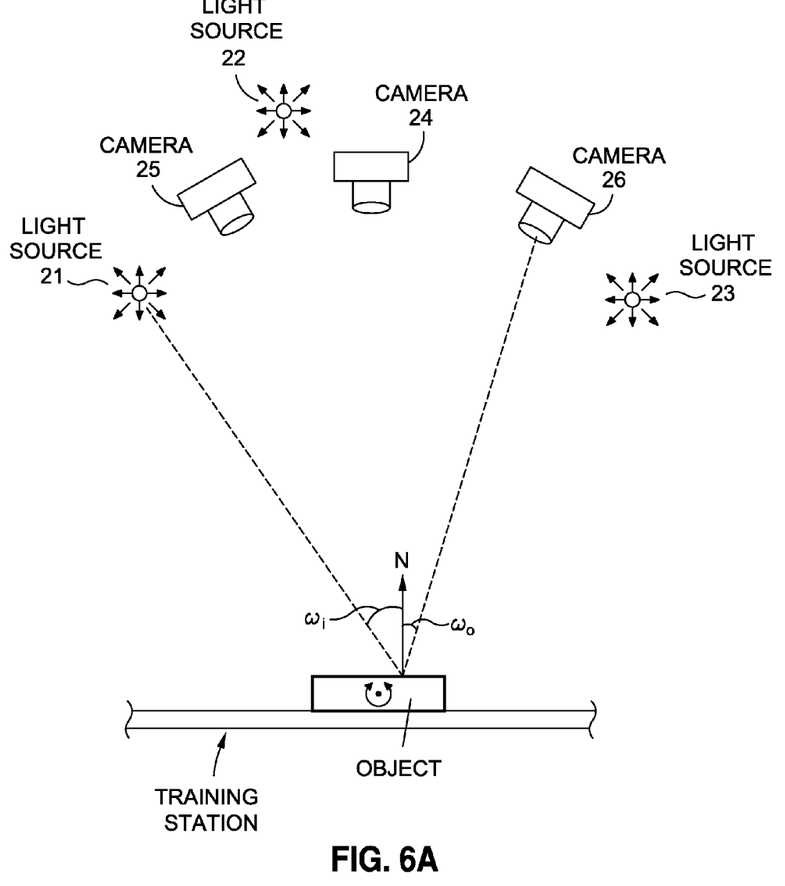
FIGS. 6A through 6C are views illustrating an example embodiment of a setup used for training a material classification engine and for obtaining its performance characteristics.
Figure 6B:
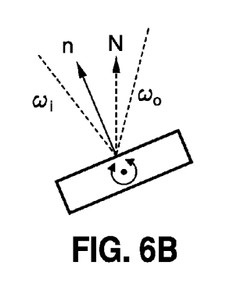
Figure 6C:
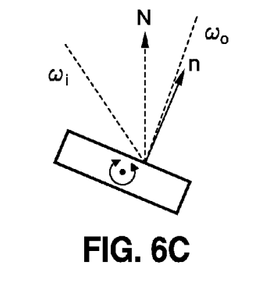

FIGS. 6A through 6C depict an example embodiment of a setup used for training a classification engine and for characterizing the performance characteristics of the trained classification engine. Briefly, in FIG. 6A, a training setup comprises a set of light sources 21, 22 and 23 in the same illumination directions as shown in use during classification in FIG. 2 and a set of cameras 24, 25 and 26 in the same viewing directions as shown in use during classification in FIG. 2.

In the example embodiment, classification engines are trained to classify materials using a material property based on BRDF slices. The BRDF (bidirectional reflectance distribution function) describes the angular variation of the reflectance of a surface at a surface point and can be used to identify an object if the object has a characteristic surface property that can be described by the BRDF.

In FIG. 6, the BRDF is defined relative to the surface normal vector n and is a function of the angles $\omega_i$ and $\omega_o$, where $\omega_i$ is the incident light direction and $\omega_o$ is the viewing direction of the camera. Since these angles are solid angles, the BRDF is a function defined on a 4-dimensional space. In practice, instead of measuring the BRDF in the full 4-dimensional space, which can be prohibitively time and resource intensive, slices of BRDF are measured instead. Typically, 1-dimensional slices and 2-dimensional slices are used. A BRDF slice is a low-dimensional section of the BRDF, and by restricting to a low-dimensional section, measurements can be less time consuming while BRDF slices of different materials may be discriminative enough such that the materials can be effectively differentiated.

In FIG. 6, each light source provides a different value of the angle $\omega_i$ while each camera viewing direction provides a different value of the angle $\omega_o$, and each combination provides a sample point of the BRDF, which collectively form a BRDF slice.

In a typical material classification approach, the directionality of the light sources and cameras of the classification system, such as the example system of FIGS. 1 and 2, is configured to be the same as the directionality of the light sources and cameras of the training setup of FIG. 6.

As in FIG. 2, the example of FIG. 6 depicts the directionality of the light sources and cameras in two dimensions. However, typical examples may also include combinations of incident and viewing angles in three dimensions.

Training data is captured using labeled objects of known shape, typically flat objects. The training direction is a property of each trained classification engine. In the example embodiment of FIG. 6, the training direction is the vertical vector N. Thus, the deviation of a surface normal vector n from N may be measured by the cosine of the angle between them: $c=c(n, N)=n \cdot N$. The performance of a trained classification engine may typically be described by the confusion matrix $\gamma_{ij}=p(\hat{x}=j|x=i)$ where x is the random variable of the true material of an object while $\hat{x}$ denotes the random variable of the estimated material as returned by the trained classification engine, as shown in the examples of FIGS. 4A through 4D. In the example of FIG. 6, the confusion matrix also depends on $c=c(n, N)$, as in FIGS. 4A through 4D.

During the training of the classification engine, the flat samples are placed at the training station so that the surface normal vectors are aligned with training direction N.

The performance characteristics shown in FIGS. 4A through 4D can be determined as part of the training phase, after the classification engine is trained, by applying the trained classification engine to a flat sample at different normal vector orientations, for example, by rotating the flat sample relative to the training direction N, as shown in FIGS. 6B and 6C.

In other example embodiments, the confusion matrix may depend more generally on the deviation angles ($\theta$, $\phi$) with the corresponding rotation matrix $R_{\theta,\phi}$ such that $n=R_{\theta,\phi}N$. Instead of 1-dimensional look up tables as shown in FIGS. 4A through 4D, bivariate angle-dependent look up tables for $\gamma_{ij}(\theta,\phi)$ may similarly be experimentally determined during the training phase of the classification engine.

OTHER EMBODIMENTS

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a non-volatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for material classification of an object fabricated from an unknown material, comprising:
   selecting multiple pixels from a first image of the object captured at a first viewing direction;
   applying a first trained classification engine to the selected pixels so as to obtain an initial estimate of material at each selected pixel, wherein the first trained classification engine is trained at a first training direction, and wherein the first trained classification engine is characterized by performance characteristics that vary based at least in part on directional deviation from the first training direction;
   calculating a posterior probability for the collection of selected multiple pixels, wherein the posterior probability is calculated based at least in part on the performance characteristics and a directional deviation of a surface normal of the object at a selected pixel from the first training direction; and
   classifying material of the object based on the calculated posterior probability.

2. The method according to claim 1, wherein the material of the object is classified by maximizing the calculated posterior probability.

3. The method according to claim 1, wherein the selected pixels are selected from the first image of the object at spatially random positions.

4. The method according to claim 1, wherein the selected pixels are selected from the first image of the object such that the pixels are spatially independent.

5. The method according to claim 1, wherein a predetermined number of selected pixels are selected, the predetermined number being chosen so that an a priori estimate of the posterior probability is relatively high.

6. The method according to claim 1, wherein the first image of the object is captured under the same illumination conditions as when the first classification engine was trained and the first viewing direction is aligned with the first training direction.

7. The method according to claim 1, wherein calculation of the posterior probability comprises:
   determining a surface normal for each selected pixel;
   estimating a likelihood probability of the initial estimate of material at each selected pixel based on the directional deviation of the determined surface normal from the first training direction;
   deducing a joint likelihood probability for the collection of selected pixels from the estimated likelihood probabilities at the selected pixels, and
   applying Bayes' rule to the deduced joint likelihood probability, yielding the posterior probability.

8. The method according to claim 1, wherein the first trained classification engine is optimized for a surface normal that is aligned with the first training direction.

9. The method according to claim 1, wherein the first trained classification engine is optimized for a surface normal that is aligned with a fixed direction different from the first training direction.

10. The method according to claim 1, further comprising capturing multiple images of the object illuminated from respectively different ones of multiple light sources; and
   estimating the directional deviation of the surface normal of the object at each of the selected pixels from the first training direction using photometric stereo methodology based on the multiple captured images.

11. The method according to claim 1, further comprising assigning a confidence level to the classified material.

12. The method according to claim 11, further comprising the capture of additional images from different viewing directions responsive to a determination that the assigned confidence level is below a predetermined acceptance value.

13. The method according to claim 1, further comprising:
selecting multiple pixels from a second image of the object captured at a second viewing direction different from the first viewing direction; and
applying a second trained classification engine to the selected pixels of the second image so as to obtain initial estimates of material at each selected pixel of the second image;
wherein the posterior probability is calculated for the collection of both of the selected pixels of the first image and the selected pixels of the second image.

14. The method according to claim 13, wherein the second trained classification engine is trained at a second training direction, and wherein the second trained classification engine is characterized by performance characteristics that vary based at least in part on directional deviation from the second training direction; and
wherein the posterior probability is calculated using a combination of initial estimates of material from the first trained classification engine and initial estimates of material from the second trained classification engine.

15. The method according to claim 1, wherein the first trained classification engine is trained on one or more captured images of one or more objects fabricated from a known material oriented in alignment with the first training direction.

16. The method according to claim 1, wherein the first trained classification engine classifies material by a material property based on the bidirectional reflectance distribution function (BRDF).

17. The method according to claim 1, wherein the performance characteristics are defined using a confusion matrix.

18. The method according to claim 1, wherein the performance characteristics are defined for a range of angles relative to the first training direction.

19. The method according to claim 1, wherein the performance characteristics are predetermined based on applying the first trained classification engine to pixels of multiple images of one or more objects fabricated from a known material oriented at respectively multiple angles relative to the first training direction.

20. An apparatus for material classification of an object fabricated from an unknown material, comprising:
a selection unit configured to select multiple pixels from a first image of the object captured at a first viewing direction;
an application unit configured to apply a first trained classification engine to the selected pixels so as to obtain an initial estimate of material at each selected pixel, wherein the first trained classification engine is trained at a first training direction, and wherein the first trained classification engine is characterized by performance characteristics that vary based at least in part on directional deviation from the first training direction;
a calculation unit configured to calculate a posterior probability for the collection of selected multiple pixels, wherein the posterior probability is calculated based at least in part on the performance characteristics and a directional deviation of a surface normal of the object at a selected pixel from the first training direction; and
a classification unit configured to classify material of the object based on the calculated posterior probability, wherein
the selection unit, the application unit, the calculation unit and the classification unit, are all implemented by at least one processor which executes computer-executable program steps stored on at least one non-transitory computer-readable storage medium.

21. A non-transitory computer-readable storage medium storing a program for causing a computer to implement a method for material classification of an object fabricated from an unknown material, the method comprising the steps of
selecting multiple pixels from a first image of the object captured at a first viewing direction;
applying a first trained classification engine to the selected pixels so as to obtain an initial estimate of material at each selected pixel, wherein the first trained classification engine is trained at a first training direction, and wherein the first trained classification engine is characterized by performance characteristics that vary based at least in part on directional deviation from the first training direction;
calculating a posterior probability for the collection of selected multiple pixels, wherein the posterior probability is calculated based at least in part on the performance characteristics and a directional deviation of a surface normal of the object at a selected pixel from the first training direction; and
classifying material of the object based on the calculated posterior probability.

* * * * *